J. E. REDMOND.
SCRAPING AND EXCAVATING APPARATUS.
APPLICATION FILED OCT. 26, 1918.
Reissued Aug. 19, 1919.
14,717.
2 SHEETS—SHEET 1.
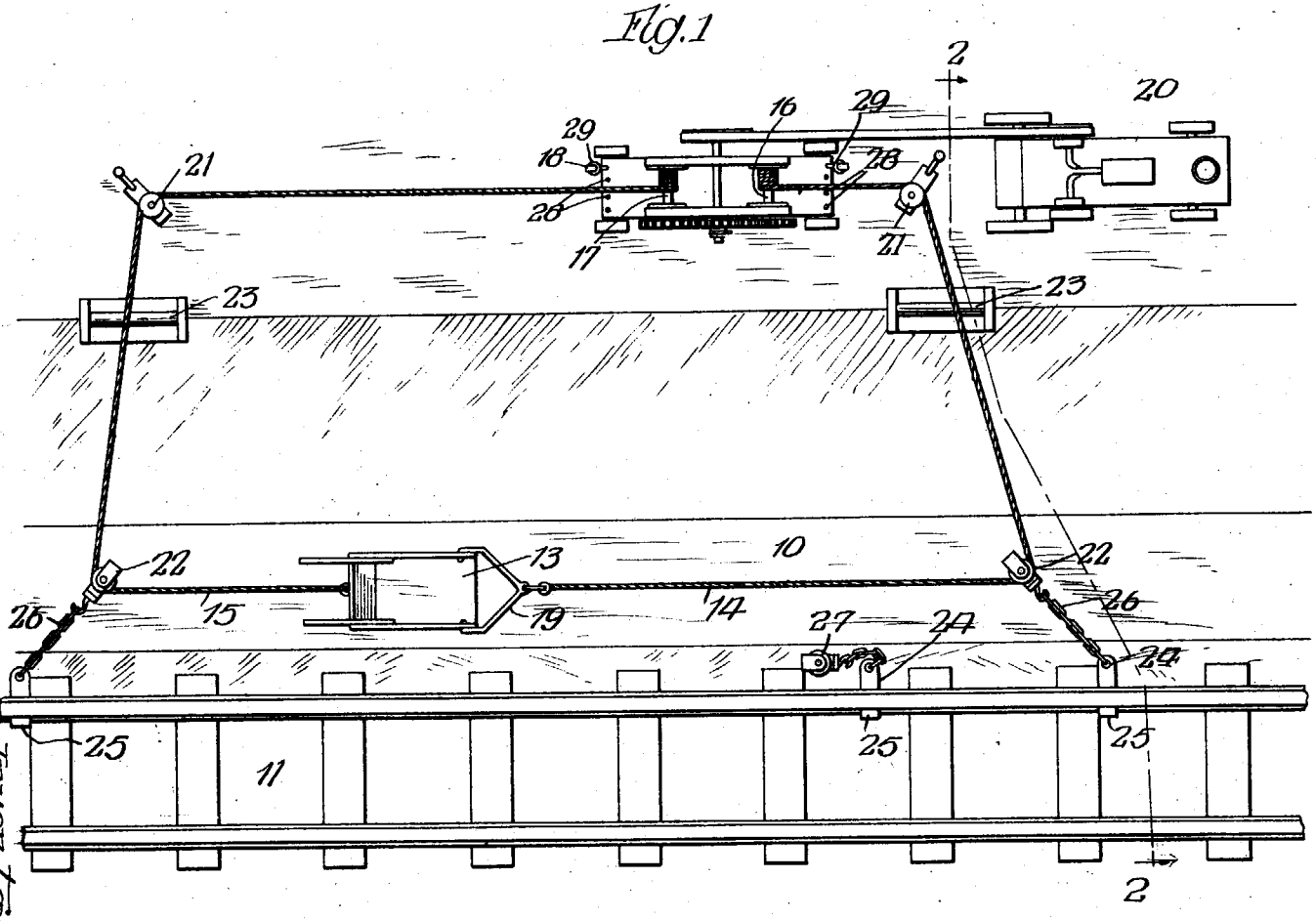
Inventor
James E. Redmond
By Parker & Carter Atty's.

J. E. REDMOND.
SCRAPING AND EXCAVATING APPARATUS.
APPLICATION FILED OCT. 26, 1918.
Reissued Aug. 19, 1919.
14,717.
2 SHEETS—SHEET 2.
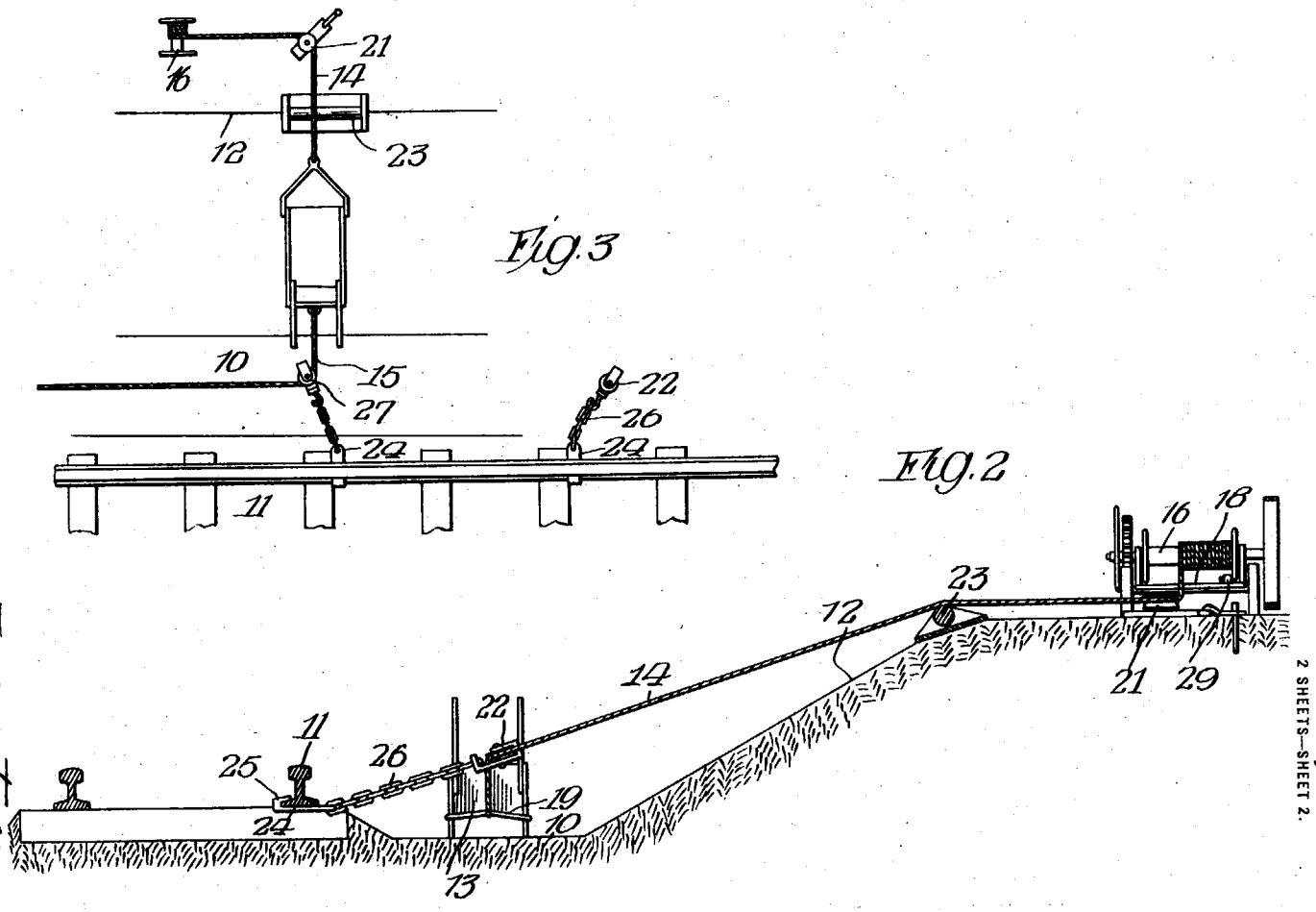
Inventor
James E. Redmond
By Parker & Carter Attys

UNITED STATES PATENT OFFICE.

JAMES E. REDMOND, OF CRANDALL, GEORGIA, ASSIGNOR, BY DIRECT AND MESNE ASSIGNMENTS, TO JOHN S. PRATT, OF TOLEDO, OHIO.

SCRAPING AND EXCAVATING APPARATUS.

14,717. Specification of Reissued Letters Patent. Reissued Aug. 19, 1919.

Original No. 1,066,655, dated July 8, 1913, Serial No. 714,655, filed August 12, 1912. Application for reissue filed October 26, 1918. Serial No. 259,875.

*To all whom it may concern:*

Be it known that I, JAMES E. REDMOND, a citizen of the United States, residing at Crandall, in the county of Murray and State of Georgia, have invented certain new and useful Improvements in Scraping and Excavating Apparatus, of which the following is a specification.

This invention relates to apparatus for scraping various materials and for excavating ditches alongside railway tracks, and its object is to provide an apparatus of this kind which can be easily and rapidly operated, and readily shifted to a new position and for changing the direction of the movement of the scraper after it has been loaded and while it is being moved from the loading point to the discharge point.

With this object in view, the invention consists in a novel combination and arrangement of parts to be hereinafter described and claimed, reference being had to the accompanying drawings, in which—

Figure 1 is a plan view showing the application of the invention.

Fig. 2 is a transverse section on the line 2—2 of Fig. 1.

Fig. 3 is a plan view showing the parts in another position.

Referring specifically to the drawings, 10 denotes a ditch running alongside a railway track 11. From the ditch rises an embankment 12. A scraper 13 is employed for excavating the ditch, said scraper being operated by cables 14 and 15 extending forward and rearward therefrom and leading to winding drums 16 and 17 mounted on a truck 18 located at the top of the embankment. To the front end of the scraper is pivotally connected a bail 19 to which the cable 14 is removably attached. The cable 15 is removably attached to the back of the scraper. The cable 14 is wound on the drum 16 and the cable 15 on the drum 17.

The drums 16 and 17 are operated by a traction engine 20, a suitable drive-gear being provided. The traction engine is also employed for hauling the truck 18 along the embankment.

In order to guide the cables 14 and 15 to their winding drums, the following devices are provided: Some distance ahead of the truck 18 is located a vertically positioned guide-pulley 21 around which the cable 14 passes and thence extends obliquely down the embankment to a snatch-block 22. At the top of the embankment is mounted a horizontal guide-roller 23 over which the cable also passes. The cable passes around the sheave of the snatch-block and then extends rearward and is connected to the bail 19 of the scraper 13. The snatch-block is anchored to one of the rails of the track by means of a shoe 24 which extends beneath the base of the rail and has one of its ends hook-shaped, as indicated at 25 to engage one of the base flanges of the rail. The other end of the shoe has an eye to which is connected a chain 26 to which latter the snatch-block is connected. Similar guide devices as herein described are provided for the cable 15.

A scraper rigged up as herein described can be easily and rapidly operated to make a ditch alongside the track. One of the drums pulls the scraper forward and the other drum rearward for a new load. The apparatus can be readily taken up and moved forward for a new cut, as the snatch-blocks permit the cables to be taken out of the same without reeving them therethrough.

A third snatch-block 27 is anchored to the track rail a short distance to the rear of the first described snatch-block 22. This snatch-block 27 is directly in line with the pulley 21 and is employed for guiding the scraper 13 up to the top of the embankment 12, which is done by disconnecting the cable 14 from the forward snatch-block 22 when the scraper reaches the snatch-block 27, and connecting the cable 15 to the snatch-block. The cable 14 being now hauled in will pull the scraper up to the top of the embankment. Fig. 3 shows the parts arranged for the last described operation.

The scraper can be detached and a plow used in its place.

To each end of the truck 18 is adjustably connected by means of a series of holes 28 a guide pulley 29, the same being designed for use in case the scraper is to be dumped out of line of the guide pulleys 21. While I have illustrated the device in connection with the moving of earth from a ditch alongside a railway track it is of course evident that the scraper can be used for moving any suitable material from one point to another, and that while I have specified pulleys as the guiding devices for the front and rear cables any other suitable guiding devices for this purpose may be used. It is also evident that the particular construction and arrangement of the several parts may be varied without departing from the spirit of my invention as embodied in the claims hereto attached.

I claim:—

1. In a scraping apparatus a scraper, operating cables connected to the front and the rear of the scraper, winding drums on which the cables are wound, guide pulleys for the cables located in front of the winding drums, a guide pulley behind the scraper from which pulley the rear cable passes to the scraper, a pair of guide pulleys in front of the scraper over one of which pulleys the front cable passes to the scraper, said front cable being disengageable from the last mentioned pulley and the rear cable being engageable with the other one of the front pulleys when the scraper is adjacent to said front pulley.

2. In a scraping apparatus a scraper, and operating cables connected to the front and to the rear of the scraper, winding drums for the cables and guide pulleys for the cables behind the scraper and in front thereof, said front cable being disengaged from its said guide pulley and the rear cable being engaged with the front pulley when the scraper is adjacent to said front pulley.

3. In a scraping apparatus a scraper, and operating cables connected to the front and to the rear of the scraper, winding drums on which the cables are wound, a guide pulley behind the scraper over which the rear cable passes, a pair of guide pulleys in front of the scraper over one of which pulleys the front cable passes, said front cable being disengageable from the last mentioned pulley and the rear cable being engageable with the other one of the front pulleys whereby the direction of movement of the scraper is changed by disengaging the front cable from its guide pulley and engaging the rear cable with one of said front pulleys when the scraper is adjacent to said front pulley.

JAMES E. REDMOND.

Witnesses:

H. H. ANDERSON,

J. M. CAMPBELL.

Copies of this patent may be obtained for five cents each, by addressing the "Commissioner of Patents, Washington, D. C."